(No Model.)

J. W. SEE.
ACREAGE INDICATOR FOR SEEDING MACHINES.

No. 308,632. Patented Dec. 2, 1884.

Witnesses:
W. A. Seward.
John R. Woods

James W. See, Inventor

UNITED STATES PATENT OFFICE.

JAMES W. SEE, OF HAMILTON, OHIO, ASSIGNOR, BY MESNE ASSIGNMENTS, TO HIMSELF AND JOHN L. RITER, OF BROWNSVILLE, INDIANA.

ACREAGE-INDICATOR FOR SEEDING-MACHINES.

SPECIFICATION forming part of Letters Patent No. 308,632, dated December 2, 1884.

Application filed January 14, 1884. (No model.)

*To all whom it may concern:*

Be it known that I, JAMES W. SEE, of Hamilton, Butler county, Ohio, have invented certain new and useful Improvements in Acreage-Indicators for Seeding-Machines, of which the following is a specification.

It is desirable that grain-drills and seeding-machines generally have attached to them some device for indicating the actual number of acres traversed by the implement while the seeding mechanism is in operation, in order that the acreage of crops may be properly calculated. My invention pertains to an attachment for this purpose.

The invention will be understood from the following description, taken in connection with the accompanying drawings, in which—

Figure 1:
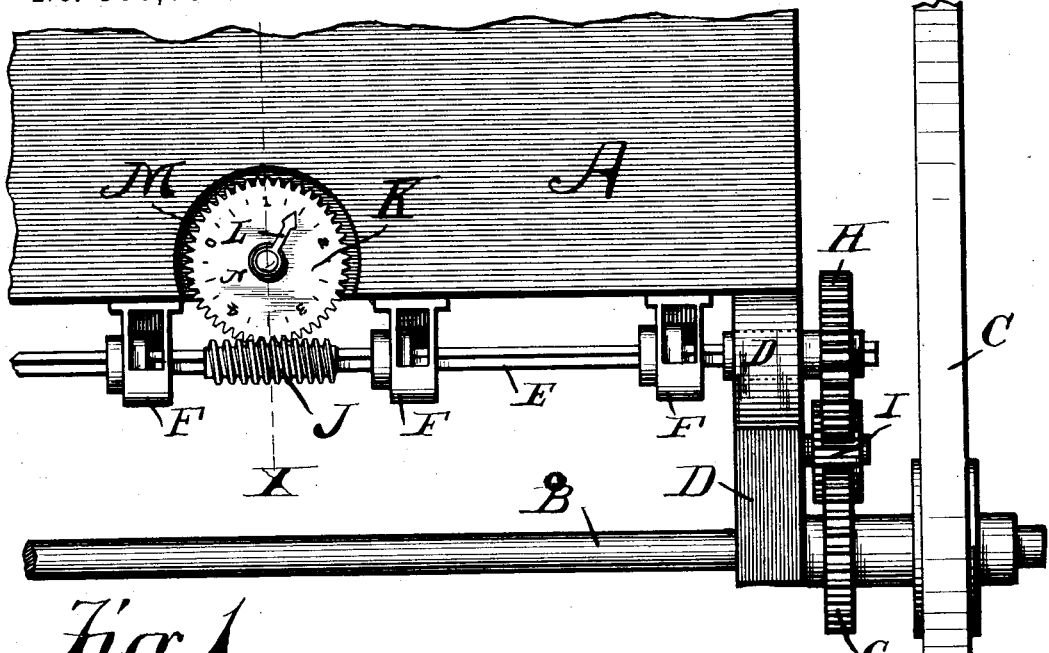
Figure 2:
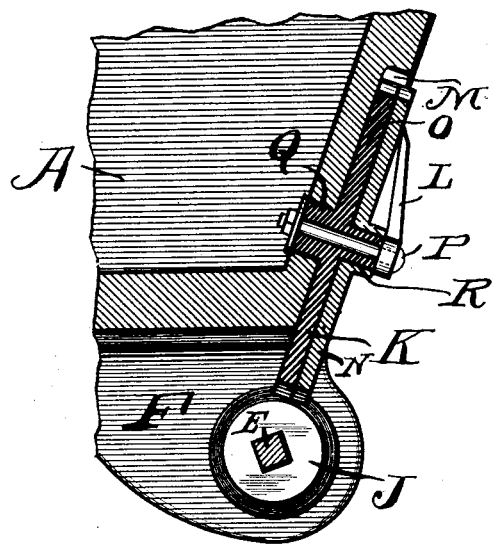

Figure 1 is a rear elevation of a portion of a grain-drill provided with my attachment, and Fig. 2 a vertical section upon the line X.

In the drawings, A represents a portion of a seed-box of a grain-drill; B, the axle of a grain-drill; C, one of the axle-wheels; D, portions of the machine-framing; E, the seed-cup shaft; F, the seed-cups; G, a gear connected with and adapted to be driven by the wheel C; H, a gear upon the seed-cup shaft; I, an intermediate gear, through which the gear G drives the gear H; J, a worm upon the seed-cup shaft; K, a double worm-gear attached to the seed-box and engaging said worm, and provided with indicating-figures upon its face; L, a pointer arranged to index upon said figures; M, a recess in the seed-box to receive the worm-gear; N, the front gear of the double-worm gear provided with a given number of teeth; O, the rear gear of the double-worm gear provided with teeth slightly less or greater in number than the teeth of the front gear, N; P, a bolt in the axis of the double-worm gear for securing the two gears and the pointer together and for securing all to the seed-box; Q, the rear hub on the rear worm-wheel journaled in the seed-box, and R the front hub of the rear worm-gear, on which is journaled the front gear, N. The bolt P clamps the pointer L and the rear worm-gear tight enough to permit the pointer to be carried around by the rear worm-gear independent of the motion of the front worm-gear, but not so tight as to prevent the setting of the pointer by hand when it is to be set at zero.

In the case illustrated by the drawings the front gear, N, is provided with forty-six teeth, the rear gear, O, with forty-seven teeth. The worm J in its rotation causes both gears to revolve in the same direction; but owing to the difference in the number of the teeth the front gear will rotate a trifle faster than the rear gear, and this gain will be indicated by the advance of the indicating-figures upon the front gear past the slower-moving pointer which moves with the rear gear. It may be said in a general way that when the rear gear makes one revolution the front gear makes one revolution plus one forty-sixth of a revolution, and that it will require two thousand one hundred and sixty-two revolutions of the worm to cause the pointer to travel entirely through the figure-circle. If the axle or ground-wheel C has a circumference of twelve and one-half feet, and the seeding-path is six feet wide, it follows that the ground-wheel is to make two thousand eight hundred and eigthy-two and six-tenths revolutions to each five acres. Giving to the gear G, fast with ground-wheel, twenty-four teeth, and to the gear H, fast on worm-shaft, thirty-two teeth, produces the desired relation of velocities. In the construction of these parts the procedure is to be substantially as follows: By multiplying the circumference of the ground-wheels by the width of seeding-track ascertain the area—say in square feet—of ground comprehended by each revolution of the ground-wheels, and call this result "area." Say it is one hundred square feet. Assuming that the device is to measure five acres before passing its unit, we find that it must be capable of measuring two hundred and seventeen thousand eight hundred square feet of land. This, divided by the above-determined area, shows that one complete revolution of the indicating apparatus must correspond with two thousand one hundred and seventy-eight revolutions of the ground-wheel. Call this the "ground-wheel value." Take for the worm-wheels a convenient diameter and number of teeth, with a difference of, say, one tooth between the numbers in each. Say forty-six and forty-seven are chosen as the number of teeth for the worm-gears. Multiply these two numbers together and you get two thousand one hundred and sixty-two as the number of revolutions which the worm must make to give the indicator a full turn. Call this figure the "indicator-value." It will be observed that we have accidentally chosen figures which bring the indicator-value and the ground-wheel value nearly equal; but of course the apparent difference is fatal to the accuracy of the apparatus. We now seek to correct the inconsistency by altering the number of teeth in the worm-gears; but we soon find that this compound worm-gear principle presents an anomaly in mechanurgy. It will be found that two worm-gears cannot run upon the same axis and be driven by the same worm and have a differential relation expressible by a value corresponding with our ground-wheel value. The peculiarity of the compound worm-gear lies in the fact that the diameters must fairly correspond with each other in order to be operated by the same worm.

As our two values cannot be brought into correspondence by the change in the number of teeth in the worm-wheels, the gear-train, transmitting motion from the ground-wheel to the worm, is to be proportioned as follows: As the ground-wheel value is to the worm-wheel value so is the gear upon the worm-shaft to the gear upon the ground-wheel shaft. In the drawings the worm-gear is shown as figured for five acres, subdivided into quarter-acres, and upon starting the seeding operation the pointer is to be shifted to zero by hand.

By the construction shown in the drawings, the worm-gears are neatly housed in the recess in the side of the seed-box, with the axis of the worm-gear arranged at sufficient angle to permit the bottom of the worm-gears to reach under the seed-box over a worm directly upon the seed-cup shaft, whereby all complication and attendant expense is avoided.

Where it becomes necessary to operate the worm-gears through a special shaft, such shaft may be driven from the axle-wheel or from the seed-cup shaft, suitable gearing being interposed at some point to transmit the motion and to properly modify the velocity in case such modification is necessary.

I claim as my invention—

1. An axle-wheel arranged to roll upon the ground, a differential worm-wheel counter-graduated into acres, a worm engaging the worm-gears of said counter, and converting gearing arranged to transmit rotary motion from said axle to said worm, all combined and arranged for operation substantially as set forth.

2. An axle-wheel arranged to roll upon the ground, a series of seed-cups, and seed-cup shaft, a worm upon the seed-cup shaft, a differential worm-gear counter-graduated into acres and engaged by said worm, and converting-gearing arranged to transmit motion from said axle-wheel to said seed-cup shaft and worm, all combined and arranged for operation substantially as set forth.

3. A seed-box, a series of seed-cups secured thereto, a seed-cup shaft engaging said seed-cups and provided with a worm, an axle-wheel arranged to roll upon the ground, converting-gearing arranged to transmit motion from said axle-wheel to said seed-cup shaft and worm, and a differential worm-wheel counter-graduated into acres and secured against the seed-box in such position that the plane of separation of the two worm-gears of the counter will cut the axis of said seed-cup shaft, all combined and arranged for operation substantially as set forth.

JAMES W. SEE.

Witnesses:
ISRAEL WILLIAMS,
W. A. SEWARD.